March 16, 1937.  C. C. BAHR ET AL  2,074,079
TORQUE MEASURING WRENCH
Filed June 12, 1935
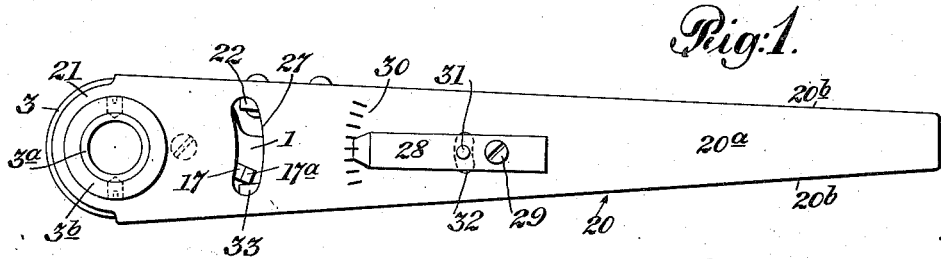
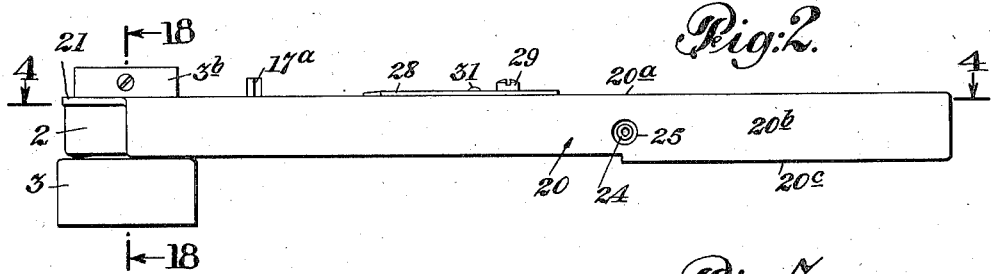
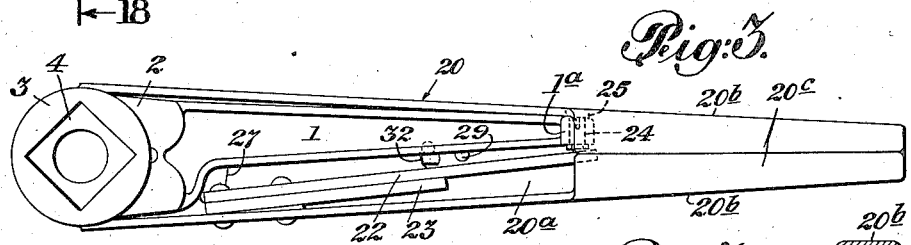
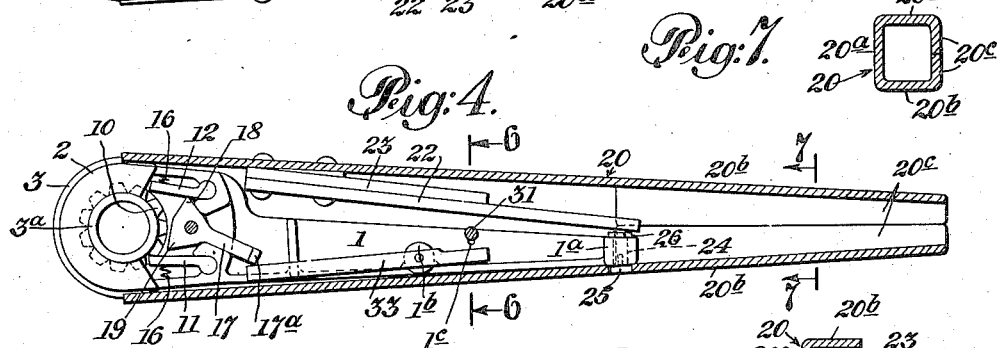
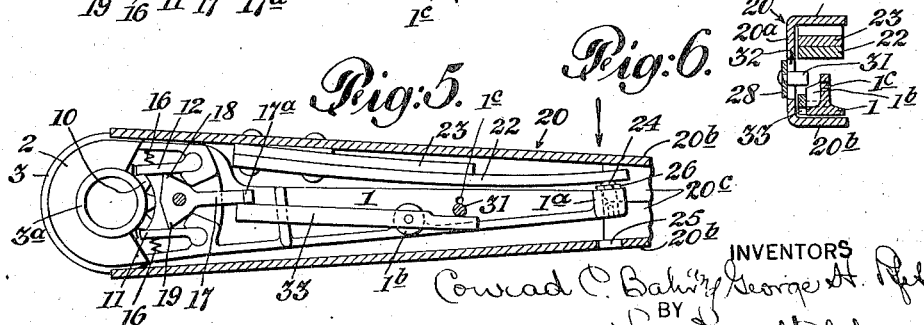
INVENTORS
Conrad C. Bahr, George H. Pfefferle
BY
ATTORNEY Patented Mar. 16, 1937

2,074,079

UNITED STATES PATENT OFFICE 2,074,079

TORQUE MEASURING WRENCH

Conrad Charles Bahr, New York, N. Y., and George H. Pfefferle, Bradford, Pa., assignors to S. R. Dresser Manufacturing Company, Bradford, Pa., a corporation of Pennsylvania Application June 12, 1935, Serial No. 26,106

7 Claims. (Cl. 265—1)

Our invention relates to ratchet type socket wrenches, and particularly applicable to wrenches of this kind which are used in the assembly of bolted pipe joints, couplings, clamps, sleeves, repair devices and other fittings. In such devices it is customary to employ a plurality (usually a circular series) of bolts and nuts to effect the compression of rubber or other elastic packing, and seal the joint, coupling or other device. The operator frequently must work in a confined space, frequently in a ditch, in the case of pipe lines for natural gas and the like, and where high internal liquid or gaseous pressures are involved, the bolts must be set up with very great pressure. Obviously the effectiveness of the seal may be partly or entirely destroyed by unequal distribution of pressure on the elastic packing material, resulting in subsequent cold flow from regions of high pressure to regions of low pressure. Inequality of bolt strain also tends to bring about undesired strain on the metal parts of the coupling or other device, with the usual result that clearances are eliminated at certain points, permitting metal-to-metal contact and relieving compression on the packing, while at other points clearances are increased, permitting exudation of the packing material, loss of compression, and even the blowing out of the packing. Aside from the effects on the packings, the application of excessive strain to bolts may produce injury to the connected metal parts, or the stripping of the threads of bolts and nuts, and even fracture of the bolts.

The physical strength of operators varies, and the leverage at which their force is exerted may frequently vary and generally it has been found by experiment that it is practically impossible for an operator to judge with any reasonable degree of accuracy to what a degree of strain a bolt is tightened, or to secure any uniformity in the tightening of bolts of a series.

Ratchet wrenches of the kind under consideration usually comprise a rotatable socket carrying member, a handle member, pivotally mounted with respect to the socket carrying member, and connected therewith by pawl and ratchet mechanism. The object of our invention is to provide means whereby an operator may be advised how much torque he is applying to a bolt or nut, or other part to be turned up, or when he has reached a predetermined torque beyond which it is not desirable to strain the bolt or nut, while at the same time the socket carrying part is not disconnected from the handle member, which might possibly result in injury to the operator.

In carrying our invention into effect in the best manner we provide such a wrench with a secondary handle member, pivotally connected with the primary handle member, adjacent to and preferably coaxially with the pivotal connection between the primary handle member and the socket carrying member, i. e., coaxially with respect to the socket. The secondary handle member is provided with a hand engaging portion, and a stiff spring is interposed between the primary and secondary handle members, normally preventing relative movement of said members in one direction, while the direct engagement of the members or stop portions connected therewith prevents relative movement of said members in the opposite direction. Coacting parts carried respectively by said handle members are brought into operation by the relative movement of said handle members against the resistance of said spring, to operate mechanism by which such relative movement of the handle members may be brought to the attention of the operator.

The relative movement of the handle members beyond a predetermined point is communicated to the operator by moving the reversing lever controlling the pawl and ratchet mechanism to neutral position, in which case the failure of the pawls to slip on an attempted backward movement of the handle members would at once notify the operator that the predetermined strain on the bolt had been reached.

It will be seen that absolute uniformity in turning up a series of bolts or other tension devices can be readily obtained, and it is not possible to defeat the apparatus by shifting the hand or hands of the operator longitudinally with respect to the secondary handle member or otherwise.

Our invention also comprises the novel features of construction and combination of parts hereinafter fully described and particularly pointed out in the claims.

Referring to the accompanying drawings,

Fig. 1 is a top plan view of a wrench embodying our invention.

Fig. 2 is a side elevation of the same.

Fig. 3 is a bottom plan view of the wrench.

Fig. 4 is a longitudinal section on line 4—4 of Fig. 2, showing the parts in normal position for operation.

Fig. 5 is a partial section, similar to Fig. 4, showing the position of the parts when the bolt or nut has been turned up by the wrench to a predetermined extent for which the indicator is set, and showing the shipping lever moved into this median position.

Fig. 6 is a transverse section through the wrench, on the line 6—6 of Fig. 4.

Fig. 7 is a transverse section of the hand engaging portion of the secondary handle member on the line 7—7 of Fig. 4.

In the embodiment of our invention shown in Figs. 1 to 7 inclusive, we have illustrated our invention embodied in a ratchet socket wrench of a well known type, in which, 1, represents the usual handle member, having at one end a head, 2, in which is rotatably mounted the cylindrical sleeve or pivot portion, 3a, of a socket member (or socket carrying member) 3, having a square or other polygonal socket, 4, to fit over the head of a bolt or over a nut. The sleeve member, 3a, is substantially coaxial with the axis of the socket and is provided with the usual securing collar, 3b. The socket member is provided with the usual ratchet teeth, 10, engaged by the usual pawls, 11 and 12, pivotally mounted with respect to the head and provided with springs, 16, tending to throw them into operative relation with the ratchet teeth, 10. The pawls, 11 and 12, are controlled by a shipper lever, 17, pivotally connected with the head, 2, and provided with shoulders, 18 and 19, for engaging the pawls respectively. By moving the lever, 17, to a median position, both pawls are permitted to engage the ratchet teeth of the socket, so that the device operates like a solid wrench, as indicated in Fig. 5. When the lever, 17, is moved into the position shown in Fig. 4, pawl, 11, is permitted to engage the socket, which will be rotated clockwise, the pawl, 12, being held in inoperative position. This is the position of use in turning up right hand bolts or nuts. If the lever, 17, is moved to a position opposite to that shown in Fig. 4, the pawls will obviously be reversed and the socket would be turned counterclockwise as in unscrewing a right hand bolt or nut.

The specific construction of the parts so far described in reference to Figs. 1 to 7, inclusive, form no part of our invention, and may be of any usual or preferred form.

20 represents a secondary handle member, which is conveniently formed of sheet metal and bent into the form described. It comprises a longitudinal plate portion, 20a, disposed perpendicularly to the axis of the socket member, 3, and having a perforated head, 21, pivotally engaging the cylindrical pivot portion, 3a, of the socket, the pivotal axes of the primary and secondary handle members, being, therefore, coaxial and coaxial with the axis of the socket. The plate portion, 20a, from a point adjacent to the socket member, to the end of the handle member, 20, is provided with parallel flanges, 20b, 20b, (see Fig. 6), extending on opposite sides of the primary handle member, 1, and at the outer end of the handle member, 20, the flanges, 20b, 20b, are provided with flanges, 20c, 20c (see Fig. 7), the adjacent edges of which are brought practically together so as to form a hand grip portion which may be of any desired form in cross section, round, square, etc., but in this instance is shown as substantially square with rounded corners. By slightly tapering the secondary handle member, 20, as shown, a very simple, strong and neat handle member is formed, the sheet material (ordinarily sheet steel) being of the proper gauge to provide ample strength to meet all requirements.

The primary handle member, 1, preferably lies closely adjacent to one of the lateral flanges, 20b, and contacts therewith, in this instance by means of a hollow, internally threaded boss, 1a, at or adjacent to the outer end of handle member, 1. The primary handle member, 1, is also shown in Fig. 6 provided with an aperture, 1c, which has no function when the wrench is used in the manner now being described, the utility of which arises in connection with a modification of our invention, not shown.

22 and 23 are flat spring members (of which there may be either one, or any desired number) constituting a spring element interposed between the handle members, 1 and 20. As shown, the spring members are riveted (or otherwise secured) to the flange, 20b, opposite that engaged by the boss, 1a, the free end portion of the spring element engaging the outer end of the handle member, 1, so as to normally hold the boss, 1a, in engagement with the adjacent flange, 20b. In order to provide for a factory adjustment of the spring when the parts are in their normal positions, we prefer to provide an adjusting screw, 24, extending through the boss, 1a, and engaging the spring element. The adjacent flange, 20b, is provided with a hole 25, through which a screw driver may be inserted to turn screw, 24, which may also be provided with a set nut, 26, as shown, if deemed desirable.

The plate portion, 20a, of the secondary handle member is provided with an arcuate slot, 27, to accommodate an angular projection, 17a, or finger piece on the shipping lever, 17, to enable said lever to be set by hand, or automatically as hereinafter described. Plate 20a is also provided with an indicator lever 28, pivotally secured thereto by means of a clamp screw, 29. This indicator lever, at its free end, operates on a scale, 30, marked on plate, 20a, in any usual or desired way, and the indicator lever carries a trip pin, 31, extending through an arcuate slot, 32, in an arc coaxial with the screw, 29. (see Figs. 1 and 6). The inner end of the trip pin, 31, lies adjacent to one end of a trip lever, 33, pivotally mounted on a boss, 1b, on the primary handle member, 1, and the other end of the trip lever, 33, lies in position to engage the arm, 17a, of shipper lever, 17, and move it from the position to turn up a right hand bolt or nut (Fig. 4) into median position (Fig. 5) in which both pawls engage the socket and hold it against rotation, in either direction with respect to the primary handle member, 1.

In the operation of this wrench, assuming that it is desired to apply a force to a bolt or bolts (or nuts), or to bring them to a point where they will exert a certain predetermined strain, the indicator lever, 28, is first set to a point on the scale, 30, corresponding to the force desired. The scale may be calibrated to read in pounds of torque pressure applied to the bolt, or bolt strain, or both as desired. Indicator lever 28 is fixed in the selected position by tightening the clamping screw 29. The operator then places the socket in engagement with the head of the bolt, or with the nut to be tightened, the shipper lever, 17, being in the position shown in Fig. 4, and begins to turn up the bolt or nut in the usual manner. So long as the torque applied is less than sufficient to flex the spring element (springs 22 and 23) both handle members will move together without any relative movement. As soon as the resistance of the bolt or nut exceeds the normal power of the spring element, the secondary handle element, 20, will move relatively to the primary handle element, 1, in the direction of the arrow, Fig. 5, and increasing the tension of the spring during the effective throw of the wrench. As the resistance of the bolt or nut increases the spring element is correspondingly compressed and the relative movement of the handle members with respect to each other brings the adjacent end of the trip lever, 33, into contact with the trip pin, 31, after which further increase in force applied by the operator to the secondary handle member will cause the trip lever to move the shipper lever, 17, into median or locked position. This movement of the shipper lever into median or locked position will ordinarily be accompanied by a sharp click, but even if this click should not be heard by the operator the next attempt of the operator to reverse the movement of the handle members will be halted by the pawl, 12, and he will be instantly advised that the bolt or nut has been turned up to the predetermined point, when he will discontinue turning up the bolt or nut. It will be noted, however, that when the trip lever, 33, is operated, the shipper lever, 17, is not thrown far enough to reverse the position of the pawls and disconnect the handle members from the socket member, but on the contrary the shipper lever is merely moved into its median position, permitting the disengaged pawl, 12, to engage the ratchet teeth as well as the pawl, 11. Consequently there is no danger of the operator exerting force at a time when there would be no resistance and which might result in injury to the operator. After the action of the tripping lever, the parts are still in operative position and the operator could exert further force on the bolt or nut, but when the pawl, 12, engages the ratchet teeth, the handle members will be locked directly to the socket against movement with respect thereto in either direction, and will, as above stated, immediately advise the operator on attempting a reverse movement of the handle that the bolt or nut has been turned up to the desired extent. While it is true that if the operator failed to hear the click of the shipper lever when thrown to median position, a slight over movement equal to the balance of the throw in which the operation of the shipper lever occurred might be imparted to the bolt or nut, ratchet wrenches are ordinarily used with a short throw, and such a minute additional turning of the bolt if it occurred would be negligible.

Obviously, by using the wrench in the manner described, in turning up a series of bolts and nuts, as in tightening up a coupling, clamp or other bolted device, all of the bolts and nuts will be subjected to the same torque and bolt strain and will uniformly compress all parts of any elastic compressible packing member which it may be desired to place under compression in order to secure a tight joint.

The form of our wrench just described possesses a number of advantages in that it may be positively set beforehand to trip the shipper lever at a predetermined torque or bolt strain and thus notify the operator without obliging him to observe or keep his eyes upon any part of the wrench, which frequently is difficult, especially in tightening bolts of couplings, clamps and the like, in a trench or excavation.

It will be understood that the socket member or socket carrying member can be readily adapted for operation with bolt heads and nuts of any usual or desired configuration and of different sizes by using in connection therewith detachable socket units of which any desired number may be provided with each wrench and used therewith.

It will be understood that variations in the details of construction of the various parts embodying our invention may be varied to suit the ideas of different manufacturers, or to adapt the wrench to special uses, without departing from the spirit of our invention.

In the following claims we have used the term "socket member" as indicating the portion of the wrench which engages a nut or the head of a bolt, whether the same is provided with a closed socket accessible from the underside only, as in the forms shown herein, or a bolt or nut engaging portion open at one side after the general manner of solid wrenches, and in either case regardless of the shape or size of the bolt or nut engaging part.

We have shown the pivotal axes of the primary and secondary handle members coaxial, and this construction will secure absolute accuracy of the indicator, regardless of the shifting of the hand of the operator longitudinally of the secondary handle member, which might otherwise defeat the purpose of the apparatus. If these pivotal points are not coaxial the torque at which the wrench operates will vary with the position of the operator's hand on the secondary handle, and the greater the distance between said pivotal axes, the greater will be the variation of the indicator, due to the secondary handle being gripped at different points longitudinally thereof. Obviously said axes may be placed sufficiently close together without being exactly coaxial, that the variation due to this cause would be negligible, and we wish it to be understood that such a variation is within the scope of our invention.

What we claim and desire to secure by Letters Patent is:

1. In a wrench, the combination with a socket member and a primary handle member operatively connected therewith by means permitting relative movement of said parts in one direction, and locking means for connecting said parts for joint movement in both directions, of a secondary handle member pivotally connected with the primary handle member and movable relatively thereto, a spring element interposed between said handle members normally holding them in fixed relation, a movable indicator part carried by one of said handle members and provided with a part for engaging a cooperating part carried by the other handle member for operating said locking means during relative movement of said members, and means for holding said indicator part in predetermined adjusted position.

2. In a wrench, the combination with a primary handle member, a rotary socket member carried thereby, pawl and ratchet mechanism operatively connecting said socket member with said primary handle member, and means for positively locking said socket member and said primary handle member against relative movement, of a secondary handle member pivotally connected with the primary handle member and movable with respect thereto, a spring element interposed between said handle members and holding them normally in fixed relation with each other, and means operated by the relative movement of said handle members against said spring element to move said locking means into locking position.

3. In a wrench, the combination with a primary handle member, a rotary socket member carried thereby, pawl and ratchet mechanism operatively connecting said socket member with said primary handle member, and means for positively locking said socket member and said primary handle member against relative movement, of a secondary handle member pivotally connected with the primary handle member and movable with respect thereto, a spring element interposed between said handle members and holding them normally in fixed relation with each other, a trip lever for said locking means carried by one of said handle members, and a part carried by the other handle member and adapted to be brought into engagement with said tripping lever by the relative movement of said handle members against said spring to bring said locking means into operative position.

4. In a wrench, the combination with a primary handle member, a rotary socket member carried thereby, pawl and ratchet mechanism operatively connecting said socket member with said primary handle member, and means for positively locking said socket member and said primary handle member against relative movement, of a secondary handle member pivotally connected with the primary handle member and movable with respect thereto, a spring element interposed between said handle members and holding them normally in fixed relation with each other, a trip lever carried by the primary handle member, an indicator lever carried by said secondary handle member and provided with a projection extending into position to engage said tripping lever during the relative movements of said handle members, and means for securing said indicator lever in fixed relation with said secondary handle member.

5. In a wrench, the combination with a primary handle member, a rotary socket member carried thereby, pawl and ratchet mechanism operatively connecting said socket member with said primary handle member, means for positively locking said socket member and said primary handle member against relative movement, of a secondary handle member enclosing the primary handle member and provided with a portion pivotally connected with the primary handle member, coaxially with the axis of the rotary socket member, a spring element interposed between said handle members and holding them normally in fixed relation, a tripping lever carried by said primary handle member for moving said locking means into operative position, an indicator lever pivotally secured to said secondary handle member and having a part projecting through a slot in said secondary handle member into position to engage said tripping lever during relative movement of said handle members, means for positively securing said indicator lever in fixed relation with said secondary handle member, and adjusting means interposed between one of said handle members and said spring element.

6. In a wrench the combination with a socket member providing a rotatable part having a socket therein, a primary handle member pivotally connected with the socket member, pawl and ratchet mechanism connecting said primary handle member and said rotary part, and means including a shipper lever for locking said rotary part and primary handle member against relative movement, of a secondary handle member connected with the primary handle member by a pivotal connection having its axis substantially coaxial with the axis of the pivotal connection between the primary handle member and the socket member, a spring interposed between said handle members, normally holding them from relative movement and transmitting to said primary handle member force applied to the secondary handle member, and means operated by the relative movement of said handle members against said spring for actuating said shipper lever and locking the primary handle member with respect to the socket member.

7. In a wrench the combination with a rotary socket member, a primary handle member connected with said socket member by a pivotal connection substantially coaxial with the axis of the socket, pawl and ratchet mechanism connecting said primary handle member with said socket member, and locking means for locking said primary handle member with respect to said socket member, including a shipper lever, of a secondary handle member connected with said primary handle member by a pivotal connection having its axis substantially coaxial with the axis of the socket, a spring interposed between said handle members normally holding them from relative movement and transmitting to the primary handle member force applied to the secondary handle member, an indicator lever pivotally supported by the secondary handle member, and provided with a part adjustable with respect to the primary handle member by movement of said indicator lever, means for securing said indicator lever in adjusted position, and a trip lever carried by the primary handle member adapted to engage said adjustable part of the indicator lever and trip said shipper lever by predetermined relative movement of the primary and secondary handle members.

CONRAD CHARLES BAHR.
GEORGE H. PFEFFERLE.